US012626477B2

(12) United States Patent
Redden

(10) Patent No.: US 12,626,477 B2
(45) Date of Patent: May 12, 2026

(54) METHOD AND APPARATUS FOR AUTOMATED PLANT NECROSIS

(71) Applicant: Deere & Company, Moline, IL (US)

(72) Inventor: Lee Redden, Palo Alto, CA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/669,300

(22) Filed: May 20, 2024

(65) Prior Publication Data

US 2024/0412479 A1 Dec. 12, 2024

Related U.S. Application Data

(63) Continuation of application No. 17/348,752, filed on Jun. 15, 2021, now Pat. No. 12,020,465, which is a
(Continued)

(51) Int. Cl.
*G06V 10/20* (2022.01)
*A01B 41/06* (2006.01)
(Continued)

(52) U.S. Cl.
CPC ............ *G06V 10/255* (2022.01); *A01B 41/06* (2013.01); *A01D 75/00* (2013.01); *A01G 7/00* (2013.01); *A01M 21/00* (2013.01); *G06T 7/11* (2017.01); *G06T 7/66* (2017.01); *G06T 7/73* (2017.01); *G06V 10/145* (2022.01); *G06V 20/188* (2022.01); *G06T 2207/20164* (2013.01);
(Continued)

(58) Field of Classification Search
None
See application file for complete search history.

(56) References Cited

U.S. PATENT DOCUMENTS

| | | |
|---|---|---|
| 4,015,366 A | 4/1977 | Hall |
| 5,222,324 A | 6/1993 | O'Neall et al. |
| | (Continued) | |

FOREIGN PATENT DOCUMENTS

| | | |
|---|---|---|
| WO | WO 94/22094 A1 | 9/1994 |
| WO | WO 2011/115666 A2 | 9/2011 |
| | (Continued) | |

OTHER PUBLICATIONS

Extended European Search Report for European Patent Application No. EP 13757748.2, dated Mar. 9, 2016, 9 Pages.
(Continued)

*Primary Examiner* — James M Mcpherson
(74) *Attorney, Agent, or Firm* — Fenwick & West LLP

(57) ABSTRACT
A method of real-time plant selection and removal from a plant field including capturing a first image of a first section of the plant field, segmenting the first image into regions indicative of individual plants within the first section, selecting the optimal plants for retention from the first image based on the first image and the previously thinned plant field sections, sending instructions to the plant removal mechanism for removal of the plants corresponding to the unselected regions of the first image from the second section before the machine passes the unselected regions, and repeating the aforementioned steps for a second section of the plant field adjacent the first section in the direction of machine travel.

18 Claims, 7 Drawing Sheets

Related U.S. Application Data continuation of application No. 16/720,021, filed on Dec. 19, 2019, now Pat. No. 11,058,042, which is a continuation of application No. 15/665,025, filed on Jul. 31, 2017, now Pat. No. 10,524,402, which is a continuation of application No. 14/713,362, filed on May 15, 2015, now Pat. No. 9,756,771, which is a continuation of application No. 13/788,359, filed on Mar. 7, 2013, now Pat. No. 9,064,173.

(60) Provisional application No. 61/609,767, filed on Mar. 12, 2012, provisional application No. 61/608,005, filed on Mar. 7, 2012.

(51) Int. Cl.

| | |
|---|---|
| *A01D 75/00* | (2006.01) |
| *A01G 7/00* | (2006.01) |
| *A01M 21/00* | (2006.01) |
| *G06T 7/11* | (2017.01) |
| *G06T 7/66* | (2017.01) |
| *G06T 7/73* | (2017.01) |
| *G06V 10/145* | (2022.01) |
| *G06V 20/10* | (2022.01) |
| *G06V 20/68* | (2022.01) |

(52) U.S. Cl.

CPC .............. *G06T 2207/30128* (2013.01); *G06T 2207/30188* (2013.01); *G06T 2207/30252* (2013.01); *G06V 20/68* (2022.01)

(56) References Cited

U.S. PATENT DOCUMENTS

| | | | |
|---|---|---|---|
| 5,296,702 | A | 3/1994 | Beck et al. |
| 5,366,154 | A | 11/1994 | Thompson |
| 5,442,552 | A | 8/1995 | Slaughter et al. |
| 5,453,618 | A | 9/1995 | Sutton et al. |
| 5,507,115 | A | 4/1996 | Nelson |
| 5,585,626 | A | 12/1996 | Beck et al. |
| 5,606,821 | A | 3/1997 | Sadjadi et al. |
| 5,621,460 | A | 4/1997 | Hatlestad et al. |
| 5,661,817 | A | 8/1997 | Hatlestad et al. |
| 5,768,822 | A | 6/1998 | Harrell |
| 5,768,823 | A | 6/1998 | Nelson |
| 5,789,741 | A | 8/1998 | Kinter et al. |
| 5,809,440 | A | 9/1998 | Beck et al. |
| 5,837,997 | A | 11/1998 | Beck et al. |
| 5,884,224 | A | 3/1999 | McNabb et al. |
| 5,911,668 | A | 6/1999 | Auerbach et al. |
| 5,924,239 | A | 7/1999 | Rees et al. |
| 6,160,902 | A | 12/2000 | Dickson et al. |
| 6,199,000 | B1 | 3/2001 | Keller et al. |
| 6,212,824 | B1 | 4/2001 | Orr et al. |
| 6,336,051 | B1 | 1/2002 | Pangels et al. |
| 6,553,299 | B1 | 4/2003 | Keller et al. |
| 6,574,363 | B1 | 6/2003 | Classen et al. |
| 6,671,582 | B1 | 12/2003 | Hanley |
| 6,795,568 | B1 | 9/2004 | Christensen et al. |
| 6,919,959 | B2 | 7/2005 | Masten |
| 6,999,877 | B1 | 2/2006 | Dyer et al. |
| 7,032,369 | B1 | 4/2006 | Eaton et al. |
| 7,212,670 | B1 | 5/2007 | Rousselle et al. |
| 7,248,968 | B2 | 7/2007 | Reid |
| 7,313,268 | B2 | 12/2007 | Luo et al. |
| 7,408,145 | B2 | 8/2008 | Holland |
| 7,412,330 | B2 | 8/2008 | Spicer et al. |
| 7,570,783 | B2 | 8/2009 | Wei et al. |
| 7,580,549 | B2 | 8/2009 | Wei et al. |
| 7,684,916 | B2 | 3/2010 | Wei et al. |
| 7,715,013 | B2 | 5/2010 | Glaser et al. |
| 7,716,905 | B2 | 5/2010 | Wilcox et al. |
| 7,721,515 | B2 | 5/2010 | Pollklas et al. |
| 7,723,660 | B2 | 5/2010 | Holland |
| 7,792,622 | B2 | 9/2010 | Wei et al. |
| 7,876,927 | B2 | 1/2011 | Han et al. |
| 7,877,969 | B2 | 2/2011 | Behnke |
| 7,894,663 | B2 | 2/2011 | Berg et al. |
| 7,904,218 | B2 | 3/2011 | Jochem et al. |
| 7,911,517 | B1 | 3/2011 | Hunt et al. |
| 8,027,770 | B2 | 9/2011 | Poulsen |
| 8,028,470 | B2 | 10/2011 | Anderson |
| 8,265,835 | B2 | 9/2012 | Peterson et al. |
| 8,537,360 | B2 | 9/2013 | Stachon et al. |
| 2003/0009282 | A1 | 1/2003 | Upadhyaya et al. |
| 2004/0149893 | A1 | 8/2004 | Scott |
| 2007/0044445 | A1 | 3/2007 | Spicer et al. |
| 2008/0141585 | A1 | 6/2008 | Benfey et al. |
| 2009/0210119 | A1 | 8/2009 | Poulsen |
| 2010/0215222 | A1 | 8/2010 | Zeelen et al. |
| 2010/0307120 | A1 | 12/2010 | Stover |
| 2010/0322477 | A1 | 12/2010 | Schmitt et al. |
| 2011/0167721 | A1 | 7/2011 | Lejeune et al. |
| 2011/0211733 | A1 | 9/2011 | Schwarz |
| 2012/0041916 | A1* | 2/2012 | Jallas ..................... A01G 7/00 706/46 |
| 2012/0101784 | A1 | 4/2012 | Lindores et al. |
| 2012/0169504 | A1 | 7/2012 | Hillger et al. |
| 2012/0215729 | A1* | 8/2012 | Johnson ................ A01G 13/00 706/45 |
| 2012/0237083 | A1 | 9/2012 | Lange et al. |
| 2013/0028487 | A1 | 1/2013 | Stager et al. |
| 2013/0291138 | A1 | 10/2013 | Feng et al. |
| 2014/0180549 | A1* | 6/2014 | Siemens ................ A01B 39/18 701/50 |

FOREIGN PATENT DOCUMENTS

| | | |
|---|---|---|
| WO | WO 2011/119403 A1 | 9/2011 |
| WO | WO 2012/094116 A1 | 7/2012 |

OTHER PUBLICATIONS

PCT International Search Report and Written Opinion, PCT Application No. PCT/US13/29548, dated May 13, 2013, 11 pages.

United States Office Action, U.S. Appl. No. 15/665,025, May 2, 2019, 10 pages.

United States Office Action, U.S. Appl. No. 13/788,359, Nov. 17, 2014, 22 Pages.

United States Office Action, U.S. Appl. No. 14/713,362, Feb. 3, 2017, 12 Pages.

United States Office Action, U.S. Appl. No. 14/713,362, Jul. 11, 2016, 22 Pages.

United States Office Action, U.S. Appl. No. 16/720,021, Dec. 22, 2020, 7 pages.

United States Office Action, U.S. Appl. No. 17/497,868, Dec. 8, 2021, 14 pages.

United States Office Action, U.S. Appl. No. 17/497,868, Jun. 13, 2022, 14 pages.

United States Office Action, U.S. Appl. No. 17/348,752, Sep. 21, 2023, 13 pages.

United States Office Action, U.S. Appl. No. 17/348,752, Apr. 5, 2023, 15 pages.

United States Office Action, U.S. Appl. No. 17/348,752, Sep. 30, 2022, 14 pages.

* cited by examiner

S100

IDENTIFY INDIVIDUAL
CROPS WITHIN IMAGE

S200

SELECTING CROPS FOR
RETENTION FROM IMAGE

S300

REMOVING CROPS FROM
CROP ROW SECTION

S400 field of view crop to be removed        field of view

METHOD AND APPARATUS FOR AUTOMATED PLANT NECROSIS

CROSS-REFERENCE TO RELATED APPLICATIONS

This application is a continuation of U.S. patent application Ser. No. 17/348,752 filed on Jun. 15, 2021 (now U.S. Pat. No. 12,020,465, issued Jun. 25, 2024), which is a continuation of U.S. patent application Ser. No. 16/720,021 filed on Dec. 19, 2019 (now U.S. Pat. No. 11,058,042, issued on Jul. 13, 2021), which is a continuation of U.S. patent application Ser. No. 15/665,025 filed on Jul. 31, 2017 (now U.S. Pat. No. 10,524,402, issued on Jan. 7, 2020), which is a continuation of U.S. patent application Ser. No. 14/713, 362, filed on May 15, 2015 (now U.S. Pat. No. 9,756,771, issued on Sep. 12, 2017), which is a continuation of U.S. patent application Ser. No. 13/788,359, filed on Mar. 7, 2013 (now U.S. Pat. No. 9,064,173, issued on Jun. 23, 2015), which claims the benefit of U.S. Provisional Application Nos. 61/608,005 filed Mar. 7, 2012 and 61/609,767 filed Mar. 12, 2012, all of which are herein incorporated in their entirety by reference.

TECHNICAL FIELD

This invention relates generally to the agricultural field, and more specifically to a new and useful method and apparatus for automated plant necrosis inducement.

BACKGROUND

Induced plant necrosis, such as crop thinning, is a common practice in agriculture, in which plants are selectively removed from densely seeded plant beds to provide the remaining plants with adequate space for growth. Conventional crop thinning is performed manually, wherein a worker walks along a crop row and removes plants within the crop row with a hoe at his discretion. Not only are these methods costly and time consuming due to the use of human labor, but these methods also fail to offer a maximization of plant yield over the entire field, as the worker typically focuses on a single row and does not select plants for retention based on inter-row packing. While automatic crop thinning systems exist, these systems fail to offer the plant removal flexibility in plant selection and removal that human labor offers. In one example, a conventional crop thinning system removes plants at fixed intervals, whether or not the plant removal was necessary. In another example, a conventional crop thinning system removes plants using system vision, but fails to identify multiple close-packed plants as individual plants and treats the close-packed plants as a single plant.

Therefore, there is a need in the agriculture implement field for a new and useful method and apparatus for automated inducement of plant necrosis.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. The Plant Necrosis Inducement Method

Figure 1:
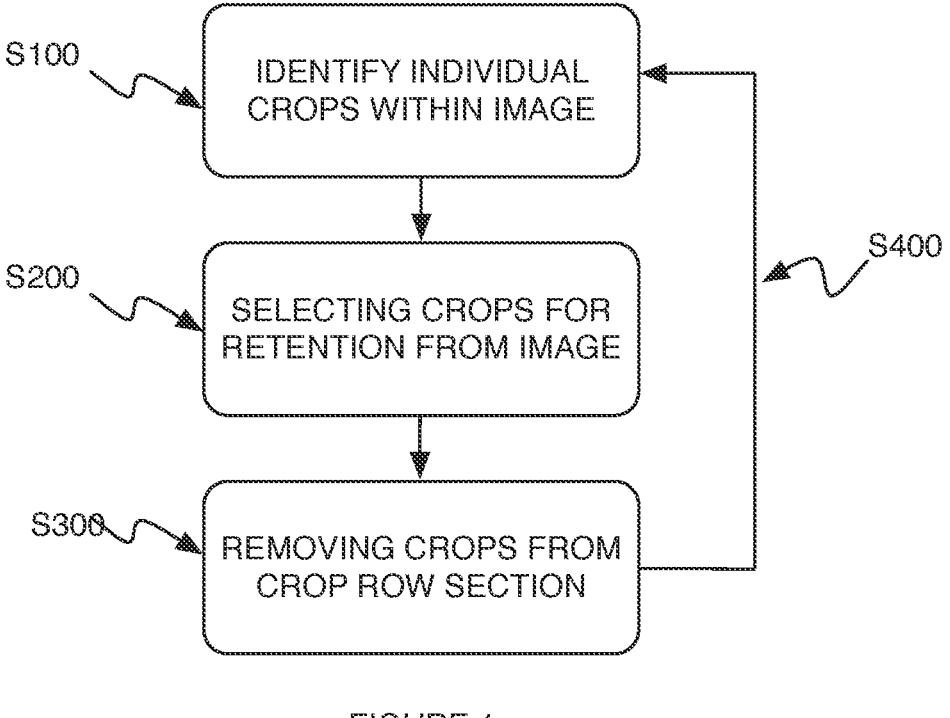
FIG. 1 is a schematic representation of the method of automated inducement of plant necrosis.

As shown in FIG. 1, the method of automated plant necrosis includes capturing an image of a plant field section, identifying individual plants within the image S100, selecting plants for retention from the image S200, removing plants from the plant field section S300, and repeating the aforementioned steps for a following plant field section S400. The plants removed by the method preferably include crops, but can alternatively include weeds or any other suitable plant. Likewise, the plant field sections are preferably crop rows, but can alternatively be weed rows, weed sections, or any other suitable portion of an area containing plants. Plant removal preferably includes inducing plant necrosis, but can alternatively include eliminating the plant or any other suitable method of killing given plants. The method is preferably performed by a system including a detection mechanism and a elimination mechanism. This method affords several benefits over conventional systems. By automating the plant removal process, this method allows for faster plant removal over that of manual methods. Furthermore, automation allows for optimization across the entire field of the retained plants for space, size, density, health, or any other suitable parameter. Automation also allows for quality control by removing the subjectivity of the human that was thinning the plants and improving the consistency of the retained plants. By identifying individual plants, this method allows for individual plant targeting for removal or retention, making the crop thinning process more reliable and the crop thinning results more predictable over that of conventional systems.

The field in which the method is used preferably includes a plurality of parallel crop rows including the same type of crop (e.g. same genus, same species, etc.). Alternatively, the field can include a first and a second crop, both of which are to be thinned. Alternatively, the field can include one or more main crops and a plurality of secondary plants, wherein the secondary plants are the plants to be removed. The crop rows are preferably spaced between 2 inches to 45 inches apart (e.g. as determined from the longitudinal row axis), but can alternatively be spaced any suitable distance apart. The crop is preferably lettuce, but can alternatively be corn, soy beans, carrots, tomatoes, broccoli, cabbage, or any other suitable commercial crop. The plant can alternatively be a weed or any other plant matter to be removed.

Identifying individual plants S100 functions to distinguish individual plants within an image of contiguous, close-growing plants. More specifically, identifying individual plants functions to determine an identifying feature that is preferably only exhibited once in each plant. The identifying features are preferably plant centers, but can alternatively be stalks, points of contact with the ground, or any other suitable identifying feature. Determination of the identifying features allow for more reliable removal and/or retention during the plant removal step. This is distinguished over conventional systems, which treat the contiguous plants (e.g. plants in contact with each other or partially occluding each other) as a single plant due the contiguous plants' appearance as a substantially continuous region (e.g., a single "blob"). As shown in FIGS. 2 to 5, identifying individual plants includes identifying a foreground region within the image S110, identifying points of interest within the foreground region S120, classifying the points of interest as plant centers or non-plant centers S130, and segmenting the foreground region into sub-regions S140, wherein each sub-region encompasses a single point of interest classified as a plant center. The image from which the individual plants can be a frame of a video or a static image. Each image can be analyzed independently (diachronically) and/or in comparison to other images to account for changes in time (e.g. synchronically).

In addition to identifying individual plants, the plant bed area, the plant bed longitudinal axis, the distance between adjacent plant beds (e.g. rows), row locations, parallelism, and coherence (e.g. how well plants are aligned within a given row) or any other suitable information about the plant beds and plant field can be estimated based on sensor data. This information can be used to improve the computational performance of point of interest identification. For example, the crop row can be identified within the image using the Hough transform, wherein the row parameters (or points of interest) can be first identified at a certain linear and/or angular location within the resultant Hough space. However, rows can alternatively be detected using a linear least-squares fit of point of interests along a row, using a least-squares method with a regression approach (e.g. outlier detection through maximum likelihood estimation or a RANSAC method), using a specially-calibrated clustering method of selecting inliers, (e.g. a clustering method that considers elliptically shaped neighborhoods of various points, etc.) can be used to recursively add points of interest to define a crop row. The recursion considers the neighborhood of points that are already considered part of the cluster from a prior iteration. The larger major axis (in the row-wise direction) and the smaller minor axis (normal to the row) allows for the inclusion of points of interest that are closely associated with a row but may be farther away from each other in the row-wise direction while rejecting outlier points of interest that may be closer to other point of interest but are too far from the row. In effect, this point-clustering method emphasizes the row-wise direction in the selection of points rather than give equal weight for points in all directions (as in the circular neighborhood approach). The image can be initially filtered using image-based filtering (e.g. adaptive binarization, color analysis, etc.) or video-based filtering (e.g. applying a Kalmann filter) to reduce noise and sensitivity to changing ambient light conditions.

Figure 2A:
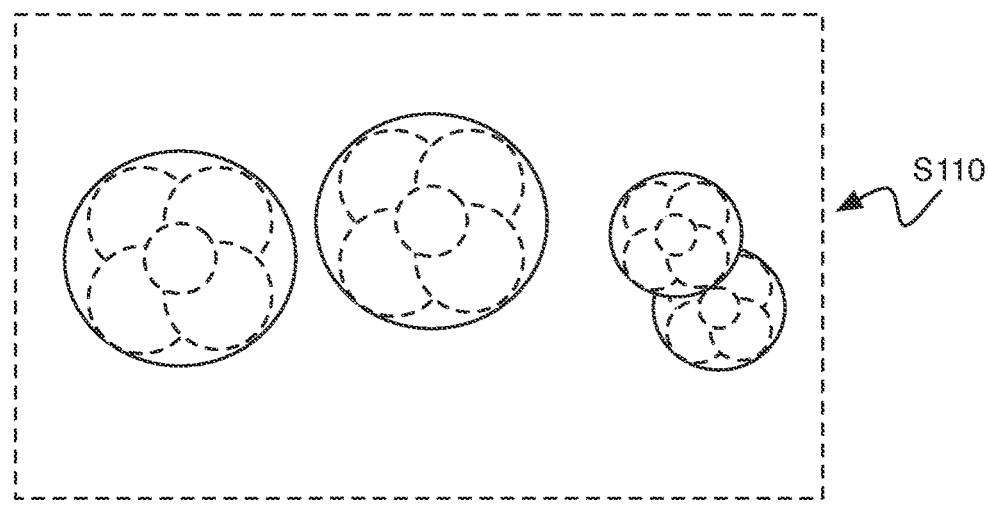
FIGS. 2A, 2B, and 2C are schematic representations of a variation of segmenting the foreground from the background within an image or field of view, identifying points of interest within the image, and classifying points of interest as plant centers within the image using machine learning, respectively.

As shown in FIG. 2A, identifying a foreground region within an image S110 includes segmenting the image into a background and a foreground. The background is preferably associated with the ground (e.g. soil or dirt), but can alternatively be the sky or any other suitable background. The foreground is preferably associated with one or more plants. Foreground segmentation is preferably performed in real-time, but can alternatively be performed at any suitable frequency. The image is preferably binarized to segment the foreground from the background, but can be otherwise processed to segment the foreground from the background. The binarization is preferably used as a mask such that only pixels that correspond to the foreground are analyzed. The foreground can be segmented based on differences in depth (e.g. wherein the foreground is determined to be closer to the viewing plane), colorfulness, chroma, brightness, or any other suitable image parameter or measured parameter. The foreground can be detected using a set threshold, a temporal average filter, running a Gaussian average, running a Gaussian mixture model classifier, or through any other suitable foreground detection or segmentation method. In one variation, the plant-pixels are converted to the HSV color-space so that conspicuous saturation in green is indicative of the presence of plant material. In another variation, the image can be filtered for excessive red colorization and excessive green colorization.

Figure 2B:
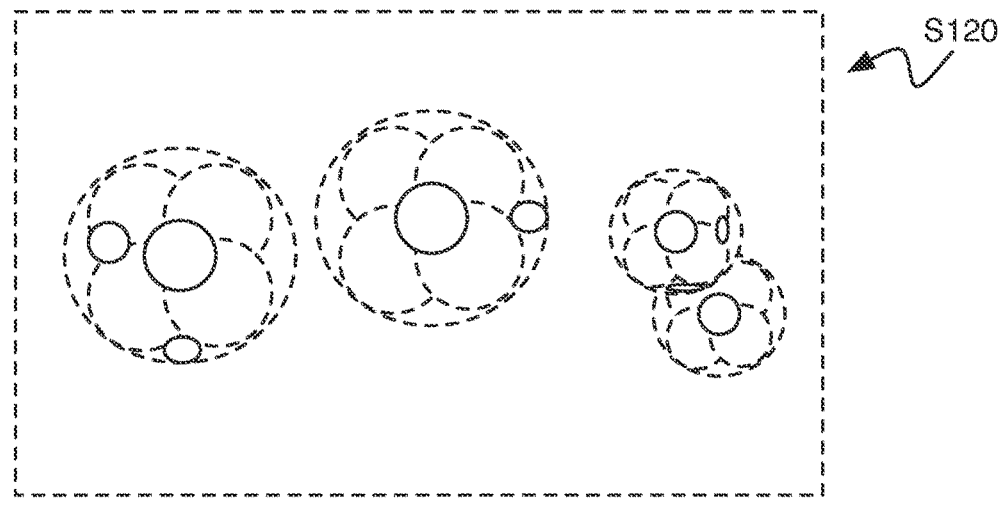

As shown in FIG. 2B, identifying points of interest within the foreground region S120 functions to identify potential plant centers within each foreground region. The plant center is preferably the region of the plant from which the upper plant leaves extend, as seen in a top-down view, and is preferably representative of the stem, the internode, the apical bud, the leaf nodes of the upper leaves, or any other suitable central portion of the plant. The plant edge is preferably the region of the plant surrounding the plant center, and is preferably defined by the blades of the plant leaves. Each extracted point of interest preferably includes one or more features that a plant center is expected to exhibit. The points of interest can be dark regions surrounded by one or more colors associated with a plant (e.g. particularly when low incidence lighting is used to capture the image). The points of interest can alternatively be regions within the image having shapes (e.g. borders) similar to an apical bud, shapes similar to a shadow cast by the topmost leaves on the plant center, shapes similar to the leaves along the plant body, colors similar to an apical bud or central flower, or be any other region having a parameter similar to that which the plant center is expected to exhibit.

The points of interest can be identified through saturation values adjacent the point of interest, through feature detection gradient analysis (e.g. wherein points of interest include regions in the foreground surrounded by sharp gradient changes or high levels of curvature in the image gradient), saturation analysis (e.g. wherein points of interest include highly saturated regions in the foreground), hue analysis, brightness analysis, shape analysis (e.g. through an application of shape filters or edge detection), blob analysis, a combination of the above, or through any other suitable method of determining a point of interest within an image or video stream. When a point of interest is identified, the position of the point of interest within the image is preferably recorded along with the defining features of the point of interest (e.g. gradient curvature, saturation, area, shape, etc.). Points of interest are preferably extracted from every foreground region identified in the image, but can alternatively be extracted from only the foreground regions indicative of multiple contiguous plants (e.g. wherein the foreground region is larger than a predetermined size threshold, has a perimeter similar to an empirically determined profile of multiple contiguous plants, etc.), wherein foreground regions indicative of a single plant (e.g. wherein the size of a foreground region is within a predetermined range, etc.) are preferably considered a single plant. In the latter case, the plant center for the foreground regions indicative of a single plant can be determined as the centroid of the region, a point equidistant from all edges of the region, a point randomly selected within the region, or any other suitable point within the region.

Classifying the points of interest as plant centers or non-plant centers S130 functions to determine individual plants within the image and to indirectly determine the location of the plant center within a crop row. Classifying the points of interest can include categorizing the points of interest into a plant center group or a non-plant group, can include assigning weights or confidence levels to each point of interest, indicative of the likelihood that said point of interest is a plant center, or can include any other suitable method or combination thereof of classifying the points of interest. While all points of interest within a given foreground region are preferably classified, a subset of points of interest can alternatively be classified, particularly when the non-classified points of interest satisfy exclusion parameters (e.g. the distance between the point of interest and the nearest edge is lower than a given percentage of the distance between the point of interest and the furthest edge, the point of interest area is below a size threshold, etc.).

Figure 2C:
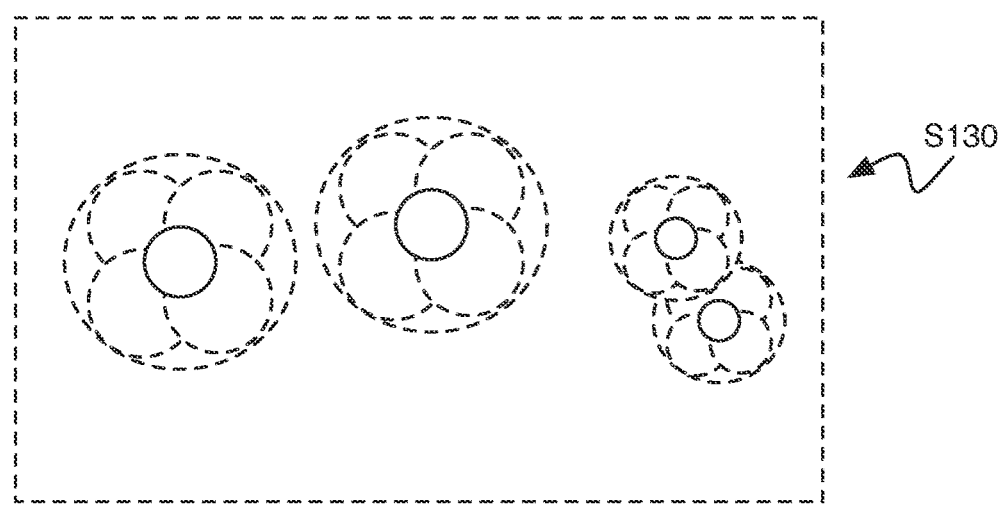

In one variation, as shown in FIG. 2C, the points of interest can be classified using machine learning algorithms or artificial intelligence, wherein the machine learning or artificial intelligence algorithms are preferably supervised learning algorithms trained on a labeled set of examples (e.g. images of plants with pre-identified plant centers) but can alternatively be unsupervised learning, semi-supervised learning, reinforcement learning, transduction, or utilize any other suitable machine learning or artificial intelligence algorithm. The machine learning algorithms preferably classify the points of interest based on feature descriptors, such as binary robust independent elementary (BRIEF) descriptors, Histogram of Oriented Gradients (HOG) features, color histograms, or any other suitable features. The machine learning algorithms can include Support Vector Machine (SVM), Naïve Bayes, or any other suitable algorithm. Alternatively, machine learning algorithms can be used to determine the confidence level for each point of interest, wherein the confidence level is the classification confidence.

Figure 3A:
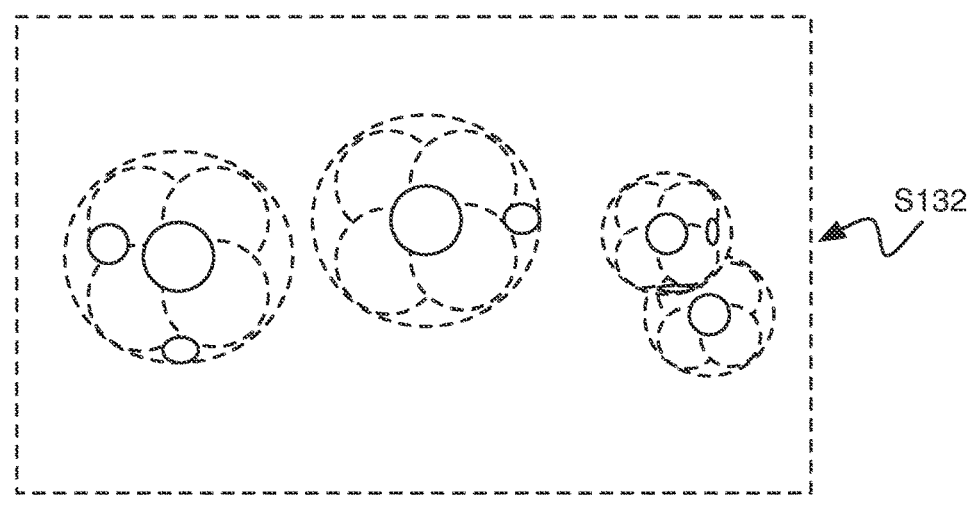
FIGS. 3A, 3B, and 3C are schematic representations of a second variation of classifying the points of interest as plant centers within the image, including identifying points of interest in a first image, identifying points of interest in a second image, and classifying recurring points of interest between the two images as plant centers, respectively.
Figure 3B:
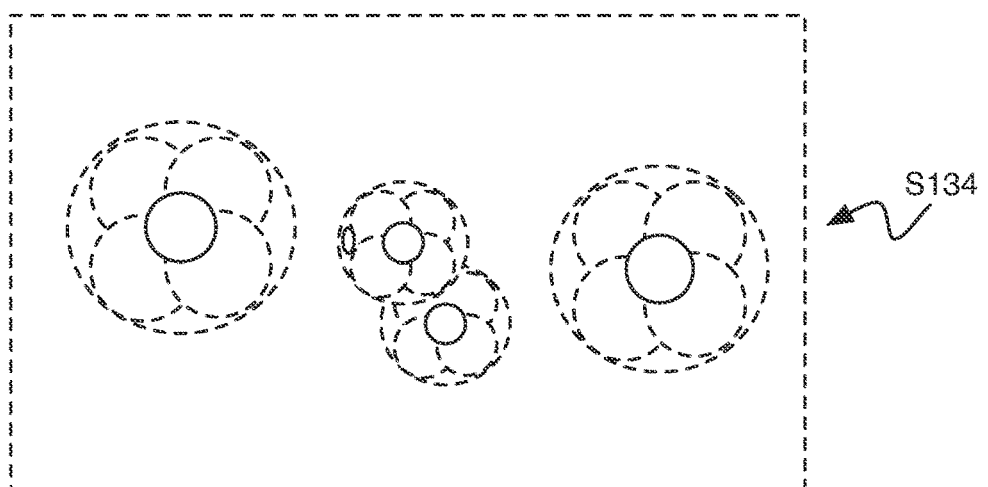
Figure 3C:
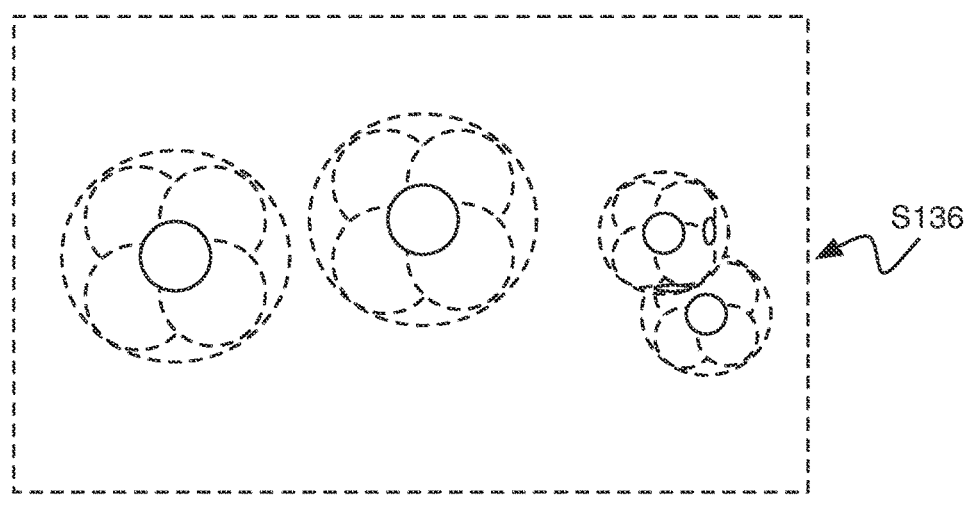

In another variation, as shown in FIG. 3, each point of interest classified as a plant center is preferably assigned a default confidence level S132 (as shown in FIG. 3A), which can be subsequently adjusted. The confidence level for the point of interest is preferably increased if the point of interest is identified or extracted from a predetermined area or pixel-neighborhood (after accounting for movement of the system) in a subsequent image S134 (as shown in FIG. 3B), and preferably decreased otherwise. The confidence level for each point of interest is preferably updated with each new image, wherein the decision whether retain or remove the plant associated with the point of interest is preferably made prior to the point of interest exiting the images. Alternatively, the confidence level of the point of interest can be proportional to the inverse of the square of the distance to the nearest point of interest to the estimated position of the first point of interest in the subsequent frame, after accounting for movement of the system. However, the confidence level for the point of interest can be otherwise determined. The point of interest is preferably classified as a plant center when the associated confidence level exceeds a predetermined threshold S136 (as shown in FIG. 3C), but can be otherwise classified. However, any other suitable method of automatically categorizing the points of interest can be used.

Figure 4A:
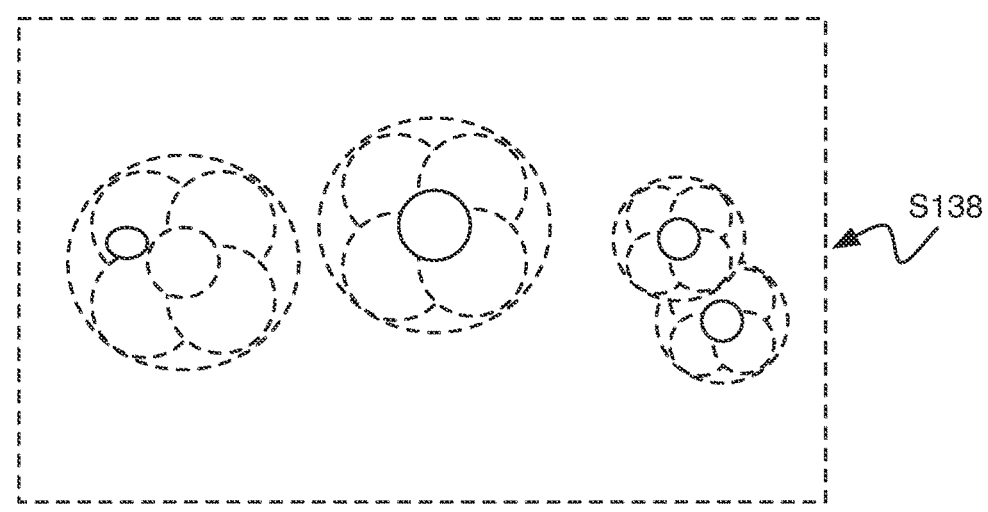
FIGS. 4A and 4B are schematic representations of presenting the image and identified plant centers to a user and reassigning the points of interest as plant centers based on the user input, respectively.
Figure 4B:
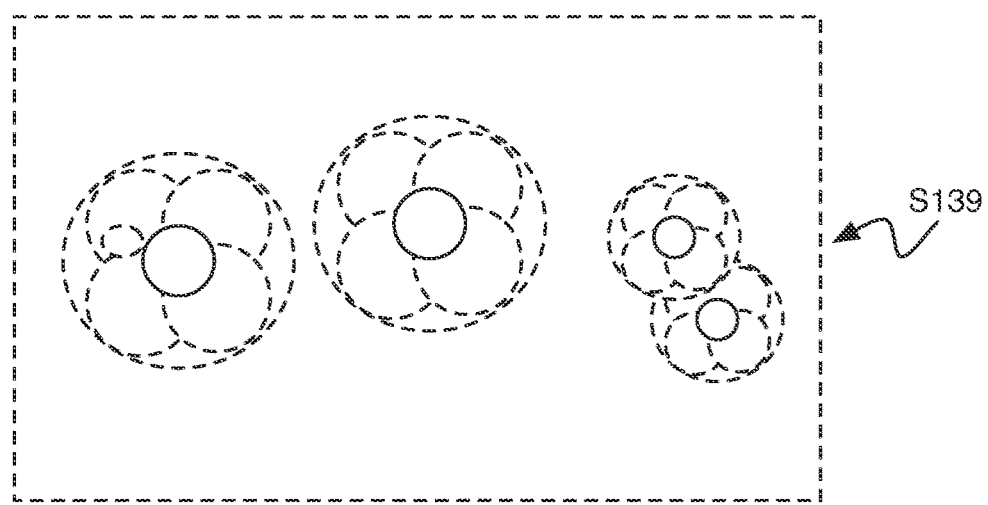

As shown in FIG. 4, classifying the points of interest S130 can additionally include displaying the points of interest classified as plant centers S138 (as shown in FIG. 4A), receiving input from a user, and reclassifying points of interest as plant centers and non-plant centers S139 (as shown in FIG. 4B). Displaying the points of interest classified as plant centers S138 preferably includes generating and sending instructions for display of the points of interest classified as plant centers to a display device (e.g. a laptop, tablet or smartphone). The points of interest classified as plant centers are preferably displayed with an indicator (e.g. a red dot, a colored area corresponding to the area of the point of interest, etc.) overlaid on the image. Receiving input from a user preferably includes receiving feedback from the user regarding the accuracy of the classification. Receiving input from a user can include receiving a plant center input (e.g. the user indicates the position of a plant center on the image), a plant center removal input (e.g. the user indicates that a point of interest classified as a plant center is not a plant center), a plant center repositioning input (e.g. the user moves the position of the plant center on the image), or any other suitable user input. Reclassifying points of interest as plant centers and non-plant centers S139 preferably includes reclassifying the points of interest according to the received user input, wherein regions of the image indicated to be plant centers are reclassified as plant centers and regions of the image indicated to be non-plant centers are reclassified as non-plant centers. Reclassifying points of interest can additionally include adding the user-edited image to the training set for the machine learning algorithms, wherein the reclassified plant centers can be used to better refine plant center identification, and the reclassified non-plant centers can be used to better refine non-plant center classification. This step is preferably performed in near real-time, preferably before plant removal instruction generation.

Figure 5:
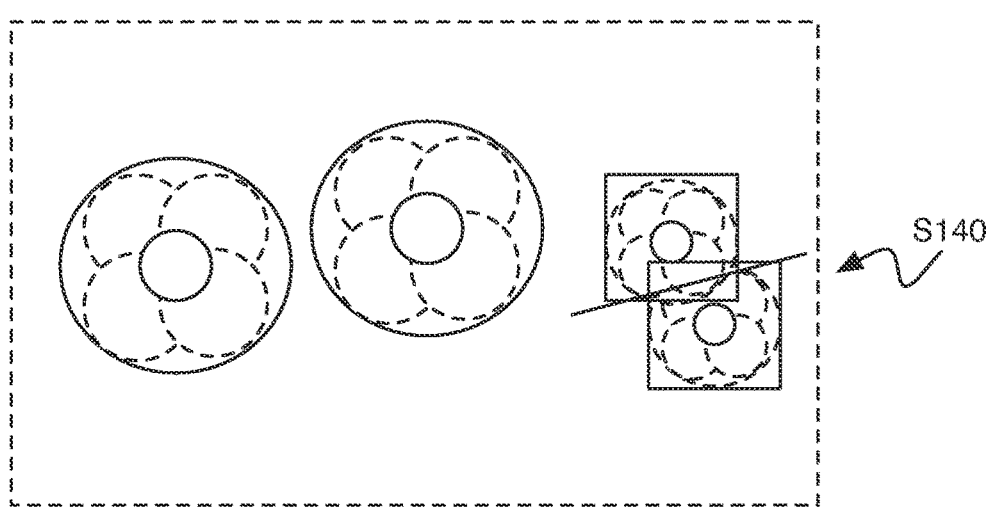
FIG. 5 is a schematic representation of segmenting the image into regions and sub-regions representative of plants.

Segmenting the foreground region into sub-regions S140 functions to identify the image area associated with each individual plant and to indirectly identify the area occupied by the respective plant within the crop row. Each substantially continuous foreground region that includes multiple points of interest classified as a plant centers is preferably segmented into the respective number of sub-regions, wherein each sub-region preferably encompasses a single point of interest classified as a plant center and can include any suitable number of points of interest classified as non-plant centers. Continuous foreground regions encapsulating a single point of interest classified as a plant center are preferably left unsegmented and are considered individual plants, but can alternatively be segmented to better delineate the area occupied by the plant. A substantially continuous foreground region including a first and second point of interest classified as plant centers can be segmented into a first and second sub-region by identifying a centerpoint equidistant from the first and second points and identifying a centerline equidistant from the first and second points, wherein the centerline intersects the centerpoint and a first and second opposing point on the foreground region edge. The first sub-region is preferably defined by the foreground region edges proximal the first point of interest and distal the second point of interest and the centerline, wherein the first sub-region is preferably entirely encapsulated by the foreground region edges and centerline. Likewise, the second sub-region is preferably defined by the foreground region edges proximal the second point of interest and distal the first point of interest and the centerline, wherein the second sub-region is preferably entirely encapsulated by the foreground region edges and centerline. Alternatively, as shown in FIG. 5, each sub-region can be defined by a rectangle or any other suitable polygon or shape. When a polygon is used, the centerline preferably intersects the polygon at a corner, and the polygon preferably intersects at least one point on the foreground region edge proximal the respective point of interest, more preferably at least a first, second, and third point on the foreground region edge proximal the respective point of interest, wherein the first edge point preferably opposes the second edge point across the respective point of interest, and the third edge point preferably opposes a point on the centerline across the respective point of interest. When the sub-regions are defined by ovals, the ovals preferably intersect the centerpoint and as many points on the foreground edge proximal the respective point of interest as possible. The portions of the sub-regions can overlap, wherein the overlapping region can be accounted for in both the first and the second sub-regions. However, the foreground region can be segmented into sub-regions in any other suitable manner.

Figure 6:
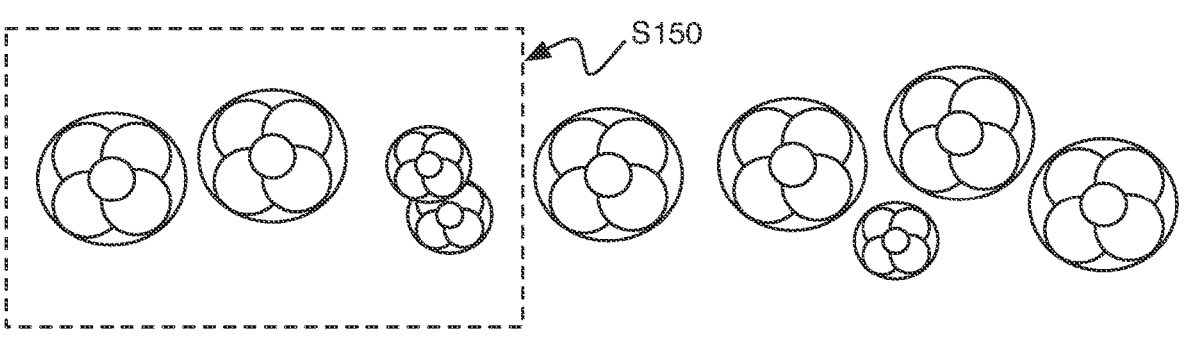
FIG. 6 is a schematic representation of capturing an image of a crop row segment.

Identifying individual plants can additionally include capturing an image of the plant field section S150, as shown in FIG. 6. More preferably, an image of a crop row section is captured, but an image of a section of any other suitable plant field can alternatively be captured. The image preferably includes a first crop row section and a second crop row section, wherein the first crop row section is substantially parallel to and adjacent the second crop row section. However, the image can be a section of a singular crop row, three or more crop row sections, or capture a representation of any suitable portion of the plant field. Capturing an image of the crop row preferably includes radiating plants within a crop row with an emitter at an angle selected to cast a shadow at a shared plant feature (e.g. the plant center) and to radiate a portion of the plant surrounding the plant feature, and collecting the reflected radiation off the plants with a detector. More preferably, capturing an image of the crop row includes illuminating plants within the crop row with a light directed at an angle between the ground and a normal vector to the ground, and collecting an image of the illuminated plants with a camera. However, the emitter can be arranged to illuminate a desired plant feature (e.g. the plant center, near the stem) or to differentiate between any other suitable plant features. The detector is preferably oriented such that the view plane is substantially parallel to the ground, but can alternatively be oriented in any other suitable angle. The plants are preferably illuminated with visible light, more preferably white light including cyan light (e.g. such as that produced from a white LED and a cyan LED), but can alternatively include infrared, near-infrared, ultraviolet, or any suitable radiation. The wavelengths and intensity of the radiation produced by the emitter are preferably substantially constant, but can alternatively be variable. In one variation, the processor adjusts the emitted wavelengths to supplement the radiation provided by the environment (e.g.

sunlight) when certain wavelengths are detected to be below a predetermined threshold, increases the intensity when an image parameter (e.g. contrast) needs to be adjusted as determined through the confidence levels of the image analysis, or otherwise adjusts the radiation emitted by the emitter. In another variation, the processor modulates each of a plurality of lights between a high and low state in a pre-set pattern, pseudo-random pattern, or any other suitable pattern to facilitate point of interest identification.

Figure 7A:
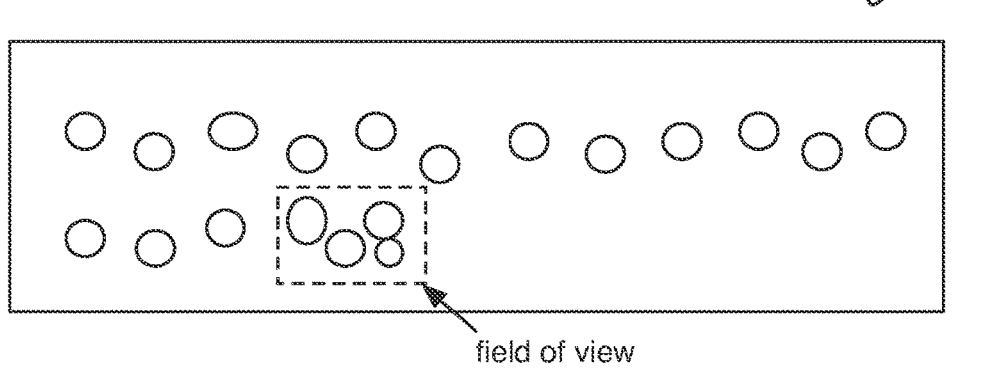
FIGS. 7A and 7B are schematic representations of updating a virtual map with the regions and sub-regions associated with plants from a first and second image, respectively.
Figure 7B:
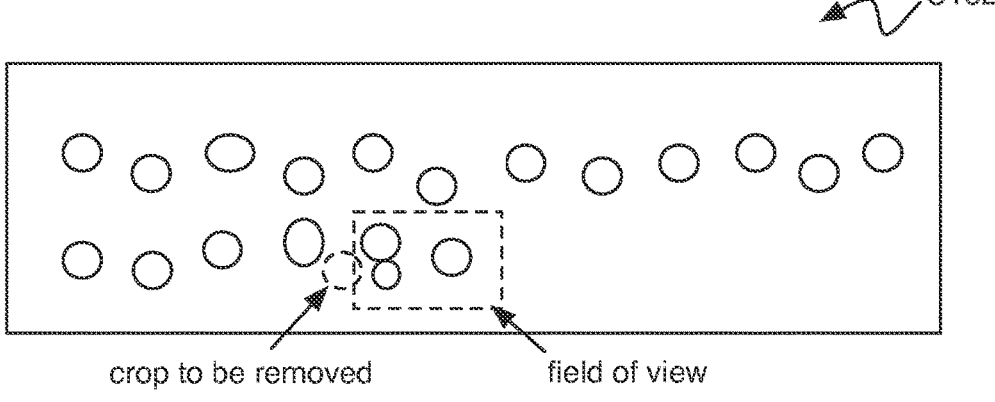

Identifying individual plants can additionally include creating a virtual map of plants S160, which functions to map the sub-regions or regions indicative of plants that are extracted from the image to a virtual map of the plant field. As shown in FIG. 7A, the virtual map functions to identify the relative position of each plant within the field, and can also function to identify the relative position of the crop thinning system relative to each identified plant. The virtual map preferably correlates directly with the actual positions of the plants (e.g. is a 1:1 representation of the analyzed portion of the plant field), but can alternatively be any other suitable representation of the actual plants on the field. As shown in FIG. 7B, the virtual map is preferably dynamically updated S162 and/or expanded with each successive image. Each sub-region or region encompassing a single point of interest classified as a plant center is preferably treated as a plant, and is preferably mapped to a position within the virtual map. The positions of the plant centers are preferably represented on the virtual map. The sub-region or region features, such as size, shape, color, or any other suitable feature, can additionally be represented on the virtual map. The positions of the plant centers are preferably identified from the position of the detection mechanism when the image was captured, and the position of the points of interest classified as plant centers within the image. The position of the detection mechanism is preferably directly tracked or indirectly tracked (e.g. wherein another point of the crop thinning system that is statically fixed to the detection mechanism is tracked) by a position-determining mechanism. The position-determining mechanism can determine the absolute geographic location, such as a global positioning system, a cellular tower triangulation system, or any other suitable location device. Alternatively, the position-determining mechanism can facilitate relative distance determination from an initial point (e.g. a starting point), such as an accelerometer, a wheel encoder, a gyroscope, or any other suitable acceleration velocity, or distance measurement mechanism. Alternatively, any suitable combination of measurement mechanisms can be used. Alternatively, the position-determining mechanism can utilize filters or any other suitable means of determining the position of the detection mechanism or crop thinning system. For example, tracking the crop thinning system position can include finding correspondences between points of interest in a current and subsequent frame, removing outliers by the Random Sample Consensus (RANSAC) method, and performing an iterative closest point (ICP) calculation to arrive at rotational and translational matrices that describe how points are projected from a prior frame to a subsequent frame.

Selecting plants for retention S200 functions to determine the plants to retain and the plants to remove from the field segment represented by the image, given only current and historical data (e.g. the current image, selections of plants for retention in previous sections, and data collected from prior crop thinning procedures). Selecting plants for retention preferably includes selecting sub-regions or regions from the image, wherein the selected sub-regions or regions are preferably indicative of individual plants determined for retention, but can conversely be indicative of the plants determined for removal. Selecting plants for retention in real-time can additionally include mapping the sub-regions to actual plants within the crop row and tracking a plant location relative to a point on the crop thinning system.

Selecting sub-regions from the image preferably includes determining an optimal pattern of retained plants that best meets a set of cultivation parameters for the section of the plant field represented by the image, based on the parameters of each sub-region, and selecting the sub-regions within the image that correspond to the retained plants to obtain the optimal retained plant pattern. The cultivation parameters can include the intra-row distance between adjacent plants (e.g. distance between plants in the same row), inter-row distance between adjacent plants (e.g. distance between plants in different rows), yield (e.g. number of plants per unit area or plant density), uniformity in plant size (e.g. uniformity between the retained sub-regions and/or foreground region area), uniformity in plant shape (e.g. uniformity in retained sub-region and/or foreground region perimeter), uniformity in plant appearance, plant size and/or shape similarity to a given size and/or shape, the confidence or probability that the sub-region or region is a plant, the practicality of keeping the respective plant, uniformity or conformance of measured plant health indicators to a plant health indicator threshold, or any other suitable parameter that affects the plant yield that can be determined from the information extracted from the image.

Determining the optimal retained plant pattern preferably includes calculating a utility or cost value for each of a set of permutations of retained plants, and selecting the optimal (e.g. maximum utility or minimum cost) permutation. However, the optimal retained plant pattern can be otherwise determined, such as through categorization, classification, optimization through randomized selection of sub-regions, or in any other suitable manner. The set of permutations of retained plants for which the utility or cost values are calculated preferably accounts for the retained (or conversely, removed) plants in crop row sections that have previously been thinned, such that the set of considered permutations is limited to those permutations including theoretically retained plants that correspond to actual retained plants within the respective crop row section, and theoretically empty spaces (e.g. no plants) that correspond to actual empty spaces within the respective crop row section. This is preferably accomplished by taking the permutation that is selected for a first section as a given in the optimization of a subsequent section, wherein permutations for the second section are determined by concatenating possible retained plant permutations for the second section onto the selected permutation of the first section. Selection of the optimal permutation includes calculating the utility or cost function for the concatenated permutations, and selecting the optimal concatenated permutation. However, the constrained set of permutations can be otherwise determined, such as by identifying all possible permutations for the current and all previously encountered sections, regardless of which plants were actually removed, then removing the permutations that do not match the actual pattern from the set of considered permutations.

Optimizing the cost or value function for intra-row and inter-row distance preferably maximizes plant packing while maintaining a select distance between the plants. For example, when the plant is a head of lettuce, the selected pattern preferably maintains a 8 inch or more radius about each plant. The optimal pattern is preferably determined by optimizing for Kepler's sphere packing problem, but can alternatively be determined in any other suitable manner. Optimizing the cost or value function for yield preferably best meets a predetermined plant density for the analyzed section or for all considered sections, including previously thinned sections and the currently analyzed section. Optimizing the cost or value function for yield can additionally include selecting the plants that maximize the area for each plant, wherein the estimated area for each plant is determined from the corresponding "blob" or area occupied by the corresponding sub-region within the image. Optimizing the cost or value function for uniformity in plant size, shape, or appearance can include selecting the pattern with retained plants having the most similar size, shape, or appearance to those plants retained in previous sections. Optimizing the cost or value function for confidence preferably maximizes the confidence that the sub-regions and regions selected for retention are indeed plants. This can be particularly useful when classification of the points of interest as plant centers and non-plant centers is probabilistic. Optimizing the cost or value function for practicality preferably accounts for the practicality of keeping each plant, wherein a plant otherwise selected for retention can be marked for removal if the cost of removal is less than the value of retention. In a first variation, a plant otherwise selected for retention can be marked for removal if the plant is in too close proximity to another plant marked for removal (e.g. the plant centers are too close, the plant overlap is over a predetermined threshold as determined from the margin of error or precision of the elimination mechanism, etc.). This is preferably determined by determining the amount of overlap or interference between the two plants (e.g. as determined from the corresponding regions in the image), wherein the plant previously marked for retention is preferably selected for retention if the amount of interference falls below a predetermined interference threshold. Determining the amount of interference can include determining the distance between the plant centers, wherein the plant previously marked for retention is preferably selected for retention if the distance is above a predetermined distance (e.g. as determined from the elimination mechanism precision, such that the plant to be removed is far enough away from the plant to be retained that the elimination mechanism has a low probability of accidentally removing or damaging the plant to be retained as well). In another variation, a plant otherwise selected for retention can be marked for removal if the elimination mechanism removal pattern cannot retain the plant. For example, when the elimination mechanism includes a spray nozzle with a linear spray pattern that is moved along the crop row perpendicular to the longitudinal crop row axis, then plants growing substantially perpendicular to the longitudinal axis cannot be separately retained. The cost or utility function can be optimized for any other suitable variable that influences the plant production. The aforementioned variables can additionally be weighted within the cost or utility function, such that the function can be tailored to favor optimization of one variable over another. The weighting is preferably determined automatically (e.g. based on historical plant data), but can alternatively be determined or derived from a user input (e.g. the user indicates that plant yield is more important than plant size uniformity, so the absolute size of the plant is weighted higher than the plant size uniformity in the cost or utility function).

Removing plants from the plant field section S300 functions to generate the selected retained plant pattern within the plant field section captured by the image. More preferably, crops are removed from the crop row section that was previously imaged, but any other suitable plant can be removed from any other suitable field of plants. Plants corresponding to the unselected sub-regions are preferably removed, but plants corresponding to the selected sub-regions can alternatively be removed. Removing plants from the field preferably includes generating plant removal instructions, sending the plant removal instructions to the elimination mechanism, and subsequently removing the plant with the elimination mechanism.

Generating plant removal instructions preferably includes determining an operation mode for each of a plurality of future time points, wherein the elimination mechanism can be operated in plant removal mode or in standby mode. The elimination mechanism is preferably instructed to operate in plant removal mode when a plant corresponding to an unselected sub-region is encountered, and is preferably instructed to operate in standby mode when a plant corresponding to a selected sub-region is encountered. However, the elimination mechanism can be operated in any other suitable manner. The future time points are preferably the times at which the elimination mechanism will be located proximal or adjacent the respective plant (e.g. when the elimination mechanism position will substantially coincide with the position of the respective plant). The future time points are preferably determined by determining the velocity of the system at the current time point, estimating the time duration required for the elimination mechanism to be adjacent the respective plant based on the velocity, the distance between the detector and the elimination mechanism, and the position of the respective plant on the virtual map (e.g. a position of the unselected region within the first image at the current time point), wherein the position of the system (e.g. the position of the detector) is preferably tracked on the virtual map, and selecting the future time point, wherein the duration between the future time point and the current time point is preferably substantially equivalent to the estimated time duration. In one variation of the method, the elimination mechanism is instructed to operate in plant removal mode by default, and is instructed to operate in standby mode a predetermined time prior to the estimated time of encounter with plant to be retained. The elimination mechanism is preferably operated in the standby mode until the elimination mechanism has passed the plant to be retained. The duration of standby mode operation is preferably determined from the acceleration of the crop thinning system and the dimensions of the sub-region associated with said plant. Generating the plant removal instructions can alternatively include determining an operation mode for each of a plurality of geographic locations, wherein each geographic location preferably corresponds with a plant, as determined from the virtual map. Generating the plant removal instructions can additionally include tracking the plant to be removed with the computer vision system (e.g., through successive images) until the plant is estimated to be located proximal the elimination mechanism.

However, any other suitable plant removal instructions can be generated.

Generating the plant removal instructions can additionally include selecting a elimination mechanism. This step is preferably performed when the crop thinning system includes more than one elimination mechanism. In one variation, the crop thinning system includes multiple elimination mechanisms of the same type, wherein generating plant removal instructions includes selecting the elimination mechanism proximal the plant to be removed or selecting the elimination mechanism having a trajectory capable of necrosing all or a subset of the plants to be removed. For example, the crop thinning system can include two nozzles fluidly connected to a removal fluid, wherein the two nozzles are configured to travel on each side of the space defined between rows, such that a first nozzle is proximal the first row and a second nozzle is proximal the second row. The crop thinning system simultaneously images sections of two rows, and generates instructions that include when to operate each nozzle (e.g. wherein the first nozzle is instructed to operate when a plant within the first row is to be removed, etc.). In another variation, the crop thinning system includes multiple types of elimination mechanisms, wherein generating plant removal instructions includes selecting the appropriate elimination mechanism based on the properties of the plant to be removed and the properties of neighboring plants. For example, generating plant removal instructions can include selecting a spray nozzle when plants should be removed from an area substantially equivalent or larger than the width of the nozzle spray and selecting a knife when the plant to be removed is surrounded by plants to be retained.

The plant removal instructions are preferably sent by the processor to the elimination mechanism before the elimination mechanism encounters the plant to be removed or retained. The plant removal instructions are preferably sent prior to the estimated future time point, but can alternatively be sent to the elimination mechanism prior to the crop thinning system travelling a distance equivalent to the distance between the detection mechanism and the elimination mechanism.

Removing the plants with the elimination mechanism preferably includes operating the elimination mechanism in the plant removal mode at the instructed time point or location. Removing the plants with the elimination mechanism can additionally include operating the elimination mechanism in the standby mode at the respective instructed time point or location. Operating the crop thinning system in plant removal mode can include spraying a removal fluid at a predetermined concentration, operating a cutting mechanism (e.g. a hoe or a scythe), operating an uprooting mechanism, generating directional heat, generating directional electricity, or include any other suitable means of facilitating plant necrosis. Operating the crop thinning system in standby mode can include spraying the removal fluid at a second predetermined concentration, spraying the removal fluid at a second flow rate lower than that of the plant removal mode, halting removal fluid provision to the nozzle, blocking the removal fluid spray, halting cutting mechanism operation, reducing the amount of generated heat, or include any other suitable means of retaining plants.

2. The Crop Thinning System

Figure 8:
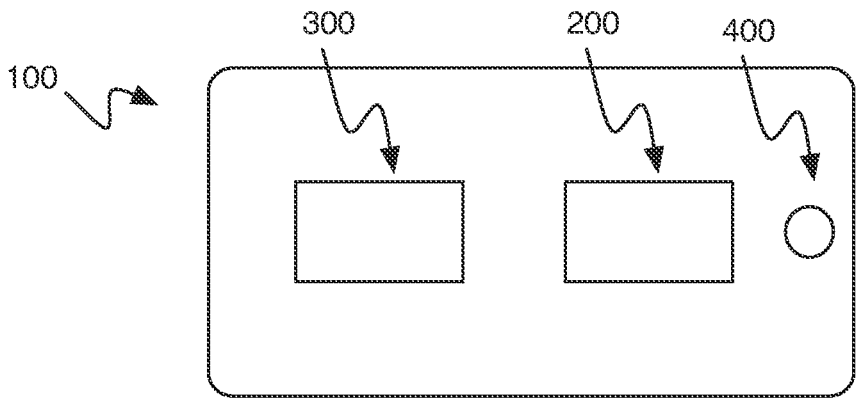
FIG. 8 is a schematic representation of the crop thinning mechanism.

As shown in FIG. 8, the system for automated crop thinning 100 includes a detection mechanism 200 and an elimination mechanism 300. The system 100 functions to image sections of a field of plants, more preferably sections of a crop row 10, determine whether to remove or retain each plant within each imaged segment, and remove the plants marked for removal as the system 100 moves along the crop row 10. More preferably, the system 100 functions to simultaneously image a section of multiple crop rows 10 (e.g. adjacent crop rows 10), determine whether to remove or retain each plant within the imaged sections, and remove the plants marked for removal from the respective rows. The system 100 preferably includes multiple detection mechanisms 200, each configured to image a single crop row 10, but can alternatively include a single detection mechanism 200 that images a section of multiple crop rows 10 (e.g. the field of view of the detection mechanism 200 spans multiple row widths), or a single detection mechanism 200 that images a section of a single crop row 10. The system 100 can include a single elimination mechanism 300 that receives plant removal instructions based on the images from the one or more detection mechanisms 200, or can include multiple elimination mechanisms 300, wherein each elimination mechanism 300 receives instructions from a single detection mechanism 200. The crop rows 10 are preferably crop rows, but can alternatively be rows of weeds or any other suitable crop row.

The detection mechanism 200 is preferably coupled to the system 100 a known distance away from the elimination mechanism 300, wherein the detection mechanism 200 is preferably statically coupled (e.g. fixed) but can alternatively be movably coupled (e.g. with an adjustable bracket) to the elimination mechanism 300. The system 100 is preferably configured to transiently couple (e.g. removably couple) to a drive mechanism, such as a tractor, through a coupling mechanism 400. However, the system 100 can alternatively include a drive mechanism that moves the system 100 along the crop row 10. The system 100 is preferably configured such that the detection mechanism 200 encounters a crop row section before the elimination mechanism 300 encounters the crop row section. In one variation, the detection mechanism 200 is mounted between a tractor couple (e.g. hitch couple) and the elimination mechanism 300. The elimination mechanism 300 and detection mechanism 200 are preferably arranged such that the centerlines of the detection mechanism 200 (e.g. centerline of the field of view) and the elimination mechanism 300 are aligned, but can alternatively be arranged such that the centerlines are offset. In the latter variation, the amount of offset is preferably known and accounted for during plant removal instruction generation. The system 100 is preferably configured to traverse along each crop row 10 once, but can alternatively traverse along each crop row 10 multiple times. The system 100 preferably traverses along a path substantially parallel to the longitudinal axis of the crop row 10, but can alternatively traverse along a path perpendicular to the longitudinal axis of the crop rows 10, zigzag across the width of the crop row 10, or travel any suitable path along the crop row 10. The system 100 is preferably configured to traverse over the top of the crop row 10 (e.g. a normal vector extending from the ground 12 preferably intersects a portion of the system 100, more preferably the detection mechanism 200 and/or elimination mechanism 300), but can alternatively traverse along the side of the crop row 10, below the crop row 10, or in any suitable position relative to the crop row 10. The detection mechanism 200 and elimination mechanism 300 position above the ground 12 is preferably defined and maintained by a transportation mechanism on the system 100 (e.g. the wheel radius, the height of a bracket above ground 12), but can alternatively be adjustable (e.g. maintained by an adjustable bracket).

The detection mechanism 200 functions to image the plants within the crop row 10. The detection mechanism 200 preferably includes an emitter 220 and a detector 240, wherein the emitter 220 directs radiation 222 toward the plants and the detector 240 receives the radiation reflected off the plants 224. The emitter 220 and detector 240 are preferably arranged in fixed relation on a bracket, but can alternatively be movably coupled on the bracket.

The emitter 220 preferably includes a plurality of radiation emitting mechanisms, but can alternatively include a single radiation emitting mechanism. The emitter 220 is preferably substantially planar (e.g. the radiation emitting mechanisms are arranged in a plane), but can alternatively be circular, toroidal, semi-spherical, or have any other suitable configuration. The radiation emitting mechanism preferably emits electromagnetic signals (e.g. waves, waveforms, etc.), more preferably visible light, most preferably visible light having a wavelength between 450 nm-550 nm (e.g. blue, cyan, and/or green). Alternatively, the electromagnetic radiation emitting mechanism can emit visible light, infrared, ultraviolet, microwave, or any other suitable electromagnetic radiation. The electromagnetic radiation emitting mechanism is preferably a light, but can alternatively be a hyperspectral emitter 220, a laser, an x-ray emitter 220, or any other suitable electromagnetic emitter 220. Alternatively, the radiation emitting mechanism can emit acoustic signals, wherein the radiation emitting mechanism can emit ultrasound, infrasound, audible sound, or any other suitable waveform. The frequency of emitted radiation from the emitter 220 is preferably static (e.g. cannot be changed), but can alternatively be adjustable. The emitter intensity is preferably adjustable between a maximum intensity (e.g. maximum applied power) and a minimum intensity (e.g. no applied power), but can alternatively be operable in only one of an on state (e.g. applied power) or an off state (e.g. no applied power). The multiple emitters 200 can be controlled independently or as a set. The frequency, intensity, and/or any other suitable radiation parameter can be adjusted in response to a change in the imaging conditions (e.g. wherein more visible light needs to be provided to meet a brightness threshold in response to a decrease in visible light provided by the sun). In one variation, the emitter 220 includes a plurality of light emitting diodes arranged in a planar configuration, wherein the light emitting diodes include white light emitting diodes and cyan light emitting diodes. The white light emitting diodes are preferably arranged in rows alternating with rows of cyan light emitting diodes, but the cyan light emitting diodes can alternatively be arranged within the same row as the white light emitting diodes. The ratio of the white light emitting diodes to cyan light emitting diodes is preferably 1:1, but can alternatively be higher or lower.

Figure 9:
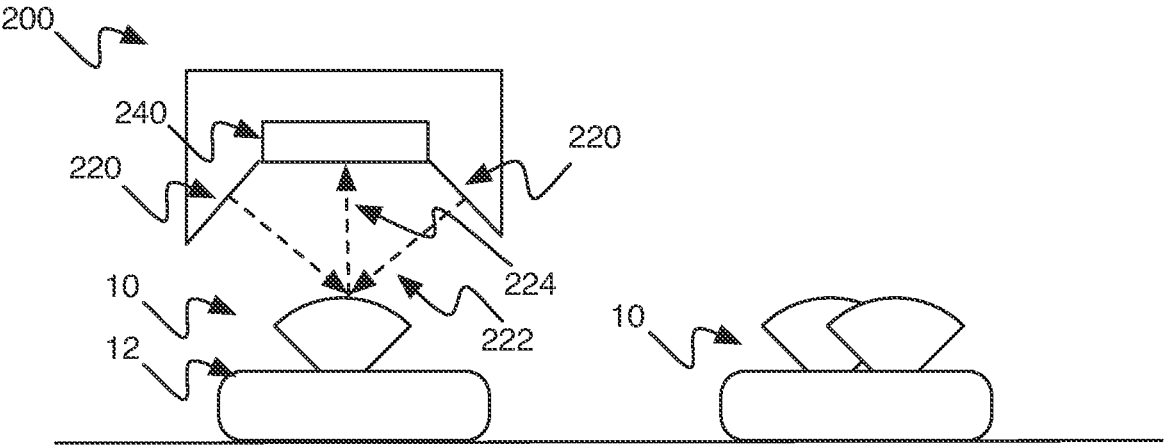
FIG. 9 is a side view of the detection mechanism utilized with a plant bed.
Figure 10:
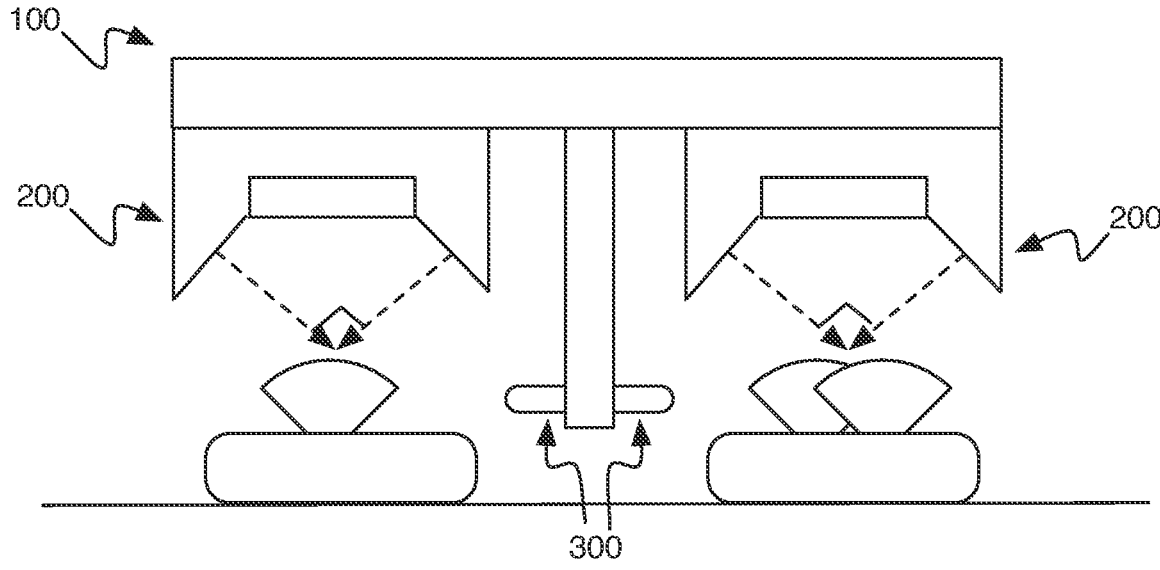
FIG. 10 is a side view of a variation of the crop thinning mechanism including a first and a second detection mechanism and a first and a second elimination mechanism.
Figure 11:
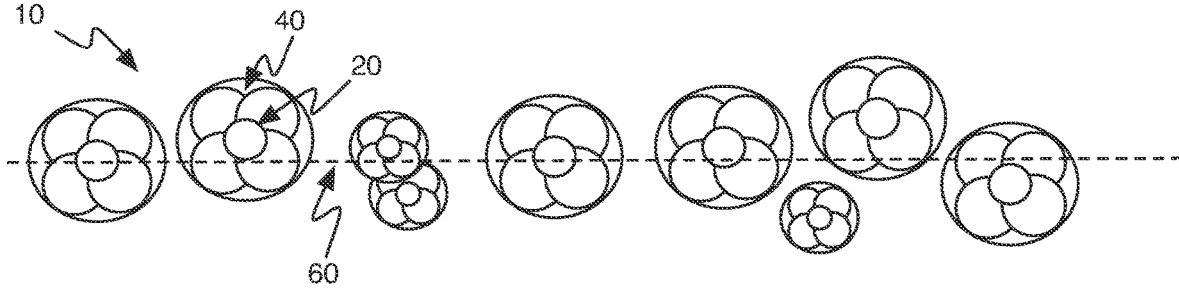
FIG. 11 is a schematic representation of a crop row.

The detector 240 is preferably a camera that records the electromagnetic radiation reflected off a plant, but can alternatively include a transducer, an IR sensor, UV sensor, or any other suitable detector 240. The detector 240 is preferably a digital camera, but can alternatively be an analog camera. The detector 240 is can include a charge coupled device (CCD) or a CMOS sensor that records the images. The detector 240 preferably has a fixed field of view (FOV) or angle of view, but can alternatively have an adjustable field of view. In the latter variation, the field of view can be adjusted based on the distance of the detector 240 from the plant or based on any other suitable imaging parameter. The detector 240 preferably generates frames of pixel data, but can alternatively generate waveforms or any other suitable signal The detection mechanism 200 is preferably configured such that the emitter 220 casts a shadow at the plant center 20 and illuminates the plant edges 40 (as shown in FIG. 11). To cast a shadow at the plant center, the detection mechanism 200 preferably directs radiation at the plant at a low incidence angle. As shown in FIGS. 9 and 10, the radiation is preferably directed at the plant at an angle between the ground 12 (e.g. 90 degrees) and a normal vector to the ground (e.g. 0 degrees), more preferably at an angle between the normal vector and the viewing plane (e.g. 90 degrees from vertical), even more preferably at an angle between 30 degrees and 60 degrees from the normal vector, such as at 45 degrees. The detection mechanism 200 is preferably configured such that the detector 240 records the light reflected off the plant without blocking plant radiation. The detector 240 is preferably arranged above the crop row 10, such that the detector 240 receives radiation reflected in a vector substantially parallel to the normal vector to the ground 12 or parallel to a gravity vector. The detector 240 is preferably arranged with the detector view plane substantially parallel to the ground 12 beneath the crop row section, but can alternatively be arranged with the detector view plane at an angle to the ground 12. In one variation, the detection mechanism 200 preferably includes two substantially planar emitters 220 configured to direct radiation from above the crop row 10 at an angle to the plant, with the detector 240 arranged between the emitters 220. The distance between the emitters 220 is preferably substantially equivalent to or wider than a standard crop row width, but can alternatively be narrower than the standard crop row width. The detection mechanism 200 preferably retains the detector 240 and emitter 220 a predetermined distance from the crop row section to be imaged, but can alternatively retain the detector 240 and emitter 220 at a predetermined distance from the ground 12 adjacent the crop row 10. In another variation, the detection mechanism 200 includes an emitter 220 including a plurality of radiation emitting mechanisms arranged in a ring, with the detector 240 arranged substantially coaxially with the ring. In another variation, the detection mechanism 200 includes an emitter 220 directed toward a mirror, wherein the mirror directs radiation toward the plant. In another variation, the detection mechanism 200 includes a mirror that reflects the radiation reflected off the plants toward the camera. In another variation, the detection mechanism 200 includes a diffuser to diffuse the radiation applied to the plant and ground. In another variation, the detection mechanism 200 includes a lens that selectively focuses or de-focuses the radiation on the plant and the ground. However, the detection mechanism 200 can be configured in any other suitable manner.

The detection mechanism 200 can additionally function to control environmental influence on the imaging environment. In one variation, the detection mechanism 200 can substantially block radiation having similar wavelengths to those emitted by the emitter 220 from reaching the crop row 10 segment during imaging. In one example, the detection mechanism 200 is arranged such that the emitter 220, detector 240, bracket, and elimination mechanism 300 cooperatively substantially block sunlight from the section to be imaged. However, the detection mechanism 200 can control the imaging environment in any other suitable manner.

The elimination mechanism 300 functions to facilitate plant necrosis, but can alternatively physically remove the plant from the field or otherwise eliminate the plant. The crop thinning system 100 preferably includes one or more nozzles fluidly connected to a reservoir of removal fluid, wherein application of the removal fluid to the plant at a given concentration initializes plant necrosis. The removal fluid is preferably fertilizer, wherein application of the fertilizer at high concentrations (e.g. 100 gallons per acre of AN20 fertilizer) necroses the plant. However, the removal fluid can be water (e.g. applied at high pressure or high temperature), steam, herbicide, pesticide, bleach, or any other suitable fluid that facilitates the necrosis or physical removal of the plant from its position within the crop row 10. The crop thinning system 100 can alternatively include one or more blades, a heating device (e.g. an infrared applicator, microwave applicator, etc.), a radiation device (e.g. device that emits ultrasound at plant-necrosing wavelengths), or any other suitable mechanism that eradicates or facilitates eradication of a plant.

In one variation of the system 100, the system 100 includes multiple spray nozzles arranged in a linear pattern and configured to travel perpendicular to the longitudinal axis of the crop rows 60. Each spray nozzle is preferably configured to remove plants from an adjacent row. In one particular variation, as shown in FIG. 10, the system 100 includes two spray nozzles, wherein the spray nozzles are preferably fixed to the system 100 and travels within the inter-row space, below the visual plane of the detector 240 (e.g. below the tops of the plants), such that a first nozzle travels adjacent a first row, and a second nozzle travels adjacent a second row. In operation, the system 100 preferably selects a nozzle for use based on the row in which the plant to be removed resides (e.g. the first nozzle is selected if the plant is in the first row). The spray nozzles preferably create a wide fan spray pattern, but can alternatively create a narrow fan spray pattern (e.g., a flat spray pattern), a cone spray pattern, a point spray pattern, or any other suitable spray pattern. The spray nozzles can be plain-orifice nozzles, shaped-orifice nozzles, surface-impingement nozzles, pressure-swirl nozzles, solid cone nozzles, compound nozzles, or any other suitable nozzle. The spray nozzles are preferably single fluid nozzles, but can alternatively be two-fluid nozzles, wherein the two fluids preferably react to produce a plant-necrosing compound. In another variation, the system 100 includes two nozzles in a linear arrangement, wherein the arrangement is configured to travel along an axis parallel to the crop row longitudinal axis. The nozzle proximal the detection mechanism 200 is preferably fluidly connected to a first removal fluid and the nozzle distal the detection mechanism 200 is preferably fluidly connected to a second removal fluid, wherein the reaction product of the first and second removal fluids preferably necroses the plant (e.g. suffocates the plant, chemically burns the plant, forms a pesticide, etc.). The first and/or second removal fluid can independently function as a fertilizer for the plant. In operation, either the first or the second removal fluid can be continually applied to the crop row 10, while the remaining removal fluid can be applied to the crop row 10 when a plant to be removed is encountered. In another variation, the system 100 includes three spray nozzles fixed to the system 100, wherein the spray nozzles are preferably configured to travel above the crop rows 10, at or above the visual plane of the detector 240 (e.g. above the tops of the plants). The spacing between each of the nozzles is preferably substantially equivalent to the spacing between the longitudinal axes of the adjacent crop rows 10, such that the first nozzle is substantially aligned with the first row, the second nozzle is substantially aligned with the second row, and the third nozzle is substantially aligned with the third row. In operation, the system 100 preferably selects a nozzle for use based on the row in which the plant to be removed resides (e.g. the first nozzle is selected if the plant is in the first row). In another variation, the system 100 can include one or more nozzles that actuates, rotating about a rotational axis to aim the removal fluid spray at the plant to be removed. In another variation, the system 100 can include one or more nozzles with fixed angular positions that are moveably coupled to a bracket, such that the linear position of each nozzle can be adjusted. In operation, the system 100 moves a nozzle above the area in which a plant is estimated to be located.

The system 100 can additionally include a processor that functions to select plants for retention, or conversely, select plants for removal. The processor can additionally function to process the image received from the detection mechanism 200 to identify individual, contiguous plants. The processor can additionally function to generate removal instructions for the plants selected for removal. The processor can additionally include memory, wherein the memory can store retained plant information (e.g. position, size, shape, etc.), removed plant information, user preferences, target plant parameters (e.g. target yield, target plant density, target size, target uniformity, etc.), or any other suitable information.

The systems and methods of the preferred embodiment can be embodied and/or implemented at least in part as a machine configured to receive a computer-readable medium storing computer-readable instructions. The instructions are preferably executed by computer-executable components preferably integrated within a towable vehicle plant-thinning vehicle, a mobile plant-thinning vehicle, an autonomous plant-thinning vehicle, or any other suitable machine or vehicle. Other systems 100 and methods of the preferred embodiment can be embodied and/or implemented at least in part as a machine configured to receive a computer-readable medium storing computer-readable instructions. The instructions are preferably executed by computer-executable components preferably integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but any suitable dedicated hardware device can (alternatively or additionally) execute the instructions.

As a person skilled in the art will recognize from the previous detailed description and from the figures and claims, modifications and changes can be made to the preferred embodiments of the invention without departing from the scope of this invention as defined in the following claims.

What is claimed is:

1. A method for a farming machine to treat a plant in a field comprising a plurality of plants, the method comprising:

accessing an image of the field comprising the plurality of plants, the image captured as the farming machine moves through the field on a current pass;

segmenting the image into a plurality of field regions by applying a machine learning model to the image, the machine learning model processing the image to localize the plurality of plants within the plurality of field regions, with each of the field regions localizing a plant of the plurality of plants within a two dimensional area in the image;

selecting, for each field region of the plurality of field regions, a spray treatment for the plant localized in the field region based on characteristics describing the localized plant and parameters describing a plurality of prior plants treated by the farming machine on a previous pass of the farming machine through the field; and sending treatment instructions for each region of the plurality of field regions to a plurality of spray mechanisms of the farming machine, the treatment instructions indicating the spray treatment to apply to each region before the farming machine travels past the region in the field on the current pass.

2. The method of claim 1, wherein applying the machine learning model to localize the plant within the two dimensional image comprises:

classifying pixels in the image as points representing the plant; and determining a position of the points representing the plant.

3. The method of claim 2, wherein classifying pixels in the image as points representing the plant comprises:

for each pixel in the image:

determining a confidence the pixel is a point of interest representing the plant; and determining, based on the confidence, the point of interest represents the plant.

4. The method of claim 2, wherein the method further comprises:

segmenting the image to localize the pixels classified as representing the plant at the determined position, the localized pixels within a portion of the two dimensional image.

5. The method of claim 1, wherein the previous farming pass occurs during a first period of time and the current farming pass occurs during a second period of time after the first period of time.

6. The method of claim 1, wherein selecting the spray treatment for the localized plant comprises:

determining, based on information from the previous pass, if a first substance or a second substance is suitable for removing the localized plant from the field; and selecting the first substance or the second substance as the spray treatment based on the determination.

7. The method of claim 1, wherein parameters describing the plurality of prior plants treated by the farming machine on a previous pass of the farming machine through the field comprises a yield metric for plants treated on the previous pass of the farming machine through the field.

8. The method of claim 1, wherein parameters describing the plurality of prior plants treated by the farming machine on a previous pass of the farming machine through the field comprises a size of plants treated on the previous pass of the farming machine through the field.

9. The method of claim 8, wherein parameters describing the size of plants treated on the previous pass are compared to an expected size of plants in the field.

10. The method of claim 1, wherein parameters describing the plurality of prior plants treated by the farming machine on a previous pass of the farming machine through the field comprises a shape of plants treated on the previous pass of the farming machine through the field.

11. The method of claim 10, wherein parameters describing the shape of plants treated on the previous pass are compared to an expected shape of plants in the field.

12. A farming machine:

a camera configured to capture images of a field comprising a plurality of plants as the farming machine travels through the field;

a plurality of spray treatment mechanism;

one or more processors; and a non-transitory computer readable medium storing instructions that, when executed, cause the one or more processors to:

access an image of the field comprising the plurality of plants, the image captured as the farming machine moves through the field on a current pass;

segment the image into a plurality of field regions by applying a machine learning model to the image, the machine learning model processing the image to localize the plurality of plants within the plurality of field regions, with each of the field regions localizing a plant of the plurality of plants within a two dimensional area in the image;

select, for each field region of the plurality of field regions, a spray treatment for the plant localized in the field region based on characteristics describing the localized plant and parameters describing a plurality of prior plants treated by the farming machine on a previous pass of the farming machine through the field; and send treatment instructions for each region of the plurality of field regions to the plurality of spray mechanisms of the farming machine, the treatment instructions indicating the spray treatment to apply to each region before the farming machine travels past the region in the field on the current pass.

13. The farming machine of claim 12, wherein applying the machine learning model to localize the plant within the two dimensional image further causes the one or more processors to:

classify pixels in the image as points representing the plant; and determine a position of the points representing the plant.

14. The farming machine of claim 13, wherein classifying pixels in the image as points representing the plant further causes the one or more processors to:

for each pixel in the image:

determine a confidence the pixel is a point of interest representing the plant; and determine, based on the confidence, the point of interest represents the plant; and wherein executing the instructions further cause the one or more processors to:

segment the image to localize the pixels classified as representing the plant at the determined position, the localized pixels within a portion of the two dimensional image.

15. The farming machine of claim 12, wherein the previous farming pass occurs during a first period of time and the current farming pass occurs during a second period of time after the first period of time.

16. The farming machine of claim 12, wherein parameters describing the plurality of prior plants treated by the farming machine on a previous pass of the farming machine through the field comprises a yield metric for plants treated on the previous pass of the farming machine through the field.

17. The farming machine of claim 12, wherein parameters describing the plurality of prior plants treated by the farming machine on a previous pass of the farming machine through the field comprises a size and a shape of plants treated on the previous pass of the farming machine through the field.

18. A non-transitory computer readable medium storing instructions for a farming machine to treat a plant in a field comprising a plurality of plants, the instructions when executed by one or more processors, causing the one or more processors to:

accessing an image of the field comprising the plurality of plants, the image captured as the farming machine moves through the field on a current pass;

segmenting the image into a plurality of field regions by applying a machine learning model to the image, the machine learning model processing the image to localize the plurality of plants within the plurality of field regions, with each of the field regions localizing a plant of the plurality of plants within a two-dimensional area in the image;

selecting, for each field region of the plurality of field regions, a spray treatment for the plant localized in the field region based on characteristics describing the localized plant and parameters describing a plurality of prior plants treated by the farming machine on a previous pass of the farming machine through the field; and sending treatment instructions for each region of the plurality of field regions to a plurality of spray mechanisms of the farming machine, the treatment instructions indicating the spray treatment to apply to each region before the farming machine travels past the region in the field on the current pass.

* * * * *